United States Patent
Reddy et al.

(10) Patent No.: US 7,526,554 B1
(45) Date of Patent: Apr. 28, 2009

(54) SYSTEMS AND METHODS FOR REACHING RESOURCE NEIGHBORHOODS

(75) Inventors: Venkat A. Reddy, Hyderabad (IN); Krishna C. Kumar, Tamil Nadu (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/137,746

(22) Filed: Jun. 12, 2008

(51) Int. Cl.
*G06F 15/173* (2006.01)
*G06F 12/00* (2006.01)

(52) U.S. Cl. .................. 709/226; 709/217

(58) Field of Classification Search .......... 709/226, 709/223, 203, 217, 218, 250
See application file for complete search history.

(56) References Cited

U.S. PATENT DOCUMENTS

| | | | |
|---|---|---|---|
| 6,286,053 B1 * | 9/2001 | Van Peursem et al. | 709/247 |
| 7,181,438 B1 * | 2/2007 | Szabo | 707/2 |
| 7,188,138 B1 * | 3/2007 | Schneider | 709/203 |
| 2005/0033823 A1 | 2/2005 | Kwong | |
| 2005/0060315 A1 | 3/2005 | Sanin | |
| 2005/0114485 A1 | 5/2005 | McCollum | |
| 2006/0074876 A1 | 4/2006 | Kakivaya et al. | |
| 2006/0085537 A1 * | 4/2006 | Dickerson et al. | 709/224 |
| 2006/0242105 A1 | 10/2006 | Shur et al. | |
| 2006/0265427 A1 * | 11/2006 | Cohen et al. | 707/200 |
| 2007/0112748 A1 | 5/2007 | Angell et al. | |
| 2007/0185860 A1 | 8/2007 | Lissack | |
| 2007/0198541 A1 * | 8/2007 | Betz et al. | 707/100 |
| 2008/0016179 A1 | 1/2008 | Kwong | |
| 2008/0033917 A1 | 2/2008 | Jones et al. | |
| 2008/0059535 A1 | 3/2008 | Lindsley et al. | |

FOREIGN PATENT DOCUMENTS

| | | |
|---|---|---|
| JP | 08-137895 | 5/1996 |
| WO | 2004053732 A2 | 6/2004 |

* cited by examiner

*Primary Examiner*—Zarni Maung
(74) *Attorney, Agent, or Firm*—Carpenter Patent Law; Robert K. Carpenter (57) ABSTRACT

A method includes determining a source URI and extracting meta data from a resource downloaded from a network; storing the source URI and extracted meta data; and utilizing the stored URI and extracted meta data to formulate a search for another resource located on the network. A computer and computer program code are also provided.

1 Claim, 7 Drawing Sheets

FIG. 1

| File Name on Workstation | Source URI | Download URI | Base URI | File Meta Data | Tags |
|---|---|---|---|---|---|
| 2008_05_14_Web20_Event_1_Pres_Web | http://w3.webahead.ibm.com/medialibrary/search?displyMediaSet=0&qt=web2.0&narrow_filter=all | http://w3.webahead.ibm.com/data/medialibrary/media/8654.ppt/2008_05_14_Web20_Event_1_Pres_Web | http://w3.webahead.ibm.com | Title = "abc"<br>Speaker = "xyz"<br>Album= "lmn" | Web 2.0 |

SYSTEMS AND METHODS FOR REACHING RESOURCE NEIGHBORHOODS

CROSS-REFERENCE TO RELATED APPLICATION

The present application is related to co-pending application Ser. No. 12/137,733, entitled "SYSTEMS AND METHODS FOR REACHING RESOURCE NEIGHBORHOODS," filed on the same date as the present application, which application is incorporated herein by reference in its entirety.

TECHNICAL FIELD

The technical field is directed to searching and reaching resources in a network neighborhood and to network navigation.

BACKGROUND

The Internet and other networks host a number of Resources offering service accessibility to these resources over the Internet or the network where the resource is located. The term Resource was first introduced to refer to targets of Uniform Resource Locators (URLs), but its definition has been further extended to include the referent of any Uniform Resource Identifier (RFC 3986), or Internationalized Resource Identifier (RFC 3987). Resources are typically identified by URIs. Users download a number of Resources available at the URIs onto their workstations.

A downloaded resource could be, for example, a music file, a video file, an image file, a data file etc. Such resources may include meta data tagged with each of the primary resource file. For example, a music file may include meta data such as meta data for the Title of the song, meta data for the name of the speaker or artist, and meta data for the name of the Album.

A user may require to later download additional resources from the same or similar location on the Internet or network, related to a unique resource that has already been downloaded. The user may use bookmarks such URIs thereby identifying locations to which the user may wish to return for future additional downloading of resources.

SUMMARY OF THE INVENTION

A user may require to download further resources or files from a resource neighborhood, for example a URI that has already been visited. In some embodiments, a resource neighborhood is a neighborhood or location on the Intranet/Internet/network from where the resource was previously downloaded. More particularly, in some embodiments, a resource neighborhood is a location on an Intranet/the Internet/the network where other resources having one or more characteristics in common with a previously downloaded resource may be found. For example, if a user downloads an mp3 file from source "http://mp3store.ibm.com" from the album "Top Hits", sung by a singer named "Kumar," an example neighborhood of the mp3 file could be "All songs from the album Top Hits that are hosted at http://mp3store.ibm.com."

Various aspects provide a method comprising tracking a source URI and a downloaded URI of a resource that has been identified to be downloaded, obtaining relevant meta data information from the downloaded resources and storing the URI information which includes the source URI, downloaded and the relevant information that has been extracted from the downloaded resource into a table, which will be subsequently used for formulating a relevant search argument that is used to search for other identical resources located on the neighborhood network.

In a further embodiment, a method for determining a URI and extracting meta data from a resource downloaded from a network; storing the URI and extracted meta data; and using the stored URI and extracted meta data to formulate a search for another resource located on the network is disclosed.

Various aspects provide a system and method that, given a resource downloaded onto a workstation, uses the resource to get back to a resource neighborhood.

Thus, at least some aspects and embodiments of this disclosure are directed to a method and/or system including: determining a source URI and extracting meta data from a resource downloaded from a network; storing the source URI and extracted meta data; and utilizing the stored URI and extracted meta data to formulate a search for another resource located on the network. In at least some aspects and embodiments of this disclosure, the method and/or system further includes utilizing composite URI and extracted meta data from multiple resources to formulate a search for another resource located on the network. In at least some aspects and embodiments of this disclosure, the method and/or system as described above further includes downloading the resource, and where the determining and extracting is performed in response to the downloading. In at least some aspects and embodiments of this disclosure, the source URI can be determined by mining a browser log file. In at least some aspects and embodiments of this disclosure, the method and/or system further includes mining browser log files for resources that have been downloaded prior to the determining, and extracting URI information from the browser log files. In at least some aspects and embodiments of this disclosure, in the method and/or system of this disclosure the source URI and extracted meta data are stored in a table. In at least some aspects and embodiments of this disclosure, in the method and/or system of this disclosure the determining and the extracting are performed in any order. In at least some aspects and embodiments of this disclosure, in the method and/or system of this disclosure, storing the source URI and storing the extracted meta data are performed in any order. In at least some aspects and embodiments of this disclosure, the method and/or system of this disclosure further includes presenting a user interface to a user that is preloaded with information related to a downloaded resource in response to a user request for a search.

Also, at least some aspects and embodiments of this disclosure are directed to a computer program product including a computer useable medium having a computer readable program, where the computer readable program when executed on a computer causes the computer to: determine a URI and extract meta data from a resource downloaded from a network; store the URI and extracted meta data; present a user interface to a user that is preloaded with meta data and URI information related to the downloaded resource in response to a request by a user; and perform a network search using the meta data and URI information in the user interface, after any user edits, for resources. At least some aspects and embodiments of this disclosure are directed to the computer program product where the determining and extracting is performed in response to downloading of the resource. At least some aspects and embodiments of this disclosure are directed to the computer program product where the computer readable program when executed on a computer causes the computer to mine a browser log file to determine the source URI. At least some aspects and embodiments of this disclosure are directed to the computer program product where the computer readable program when executed on a computer causes the computer to store the source URI and extracted meta data in a table. At least some aspects and embodiments of this disclosure are directed to the computer program product where the determining and the extracting are performed in any order.

Also, at least some aspects and embodiments of this disclosure are directed to a computer configured to: determine a source URI and extract meta data from a resource downloaded from a network; store the source URI and extracted meta data; present a user interface to a user that is preloaded with meta data and URI information related to the downloaded resource in response to a user request, where the preloaded information is editable in the user interface by a user; and perform a network search using the meta data and URI information in the user interface, after any user edits, for resources in response to a request by a user for a search. At least some aspects and embodiments of this disclosure are directed to the computer where the determining and extracting is performed in response to downloading of the resource. At least some aspects and embodiments of this disclosure are directed to the computer also configured to mine a browser log file to determine the source URI. At least some aspects and embodiments of this disclosure are directed to the computer also configured to store the source URI and extracted meta data in a table. At least some aspects and embodiments of this disclosure are directed to the computer also configured to preload the meta data and URI information related to the downloaded resource in response to a user selecting a resource using the user interface. At least some aspects and embodiments of this disclosure are directed to the computer also configured to present the user interface in response to a user interacting with an icon representing a resource.

Additionally, at least some aspects and embodiments are directed a method and/or system for locating a resource in a neighborhood network, the method and/or system including: selecting a source uniform resource identifier (URI) and a download URI from which a resource is to be downloaded, the source URI providing information on a number of available resources and the download URI providing the exact URI from which the resource is downloaded; tracking the source URI and the download URI of the resource being downloaded; extracting relevant resource information from the downloaded resource, the relevant resource information including at least one of a meta data or tags; and storing the source URI, download URI and the relevant information in a table, wherein the table includes at least one of a database or a lookup table.

Also, at least some aspects and embodiments are directed to a method and/or system for retrieving a neighborhood resource, the method and/or system including: selecting a resource having relevant resource information, the resource being identified by a user; displaying the relevant resource information for the selected resource to a user in a user interface, wherein the relevant resource information includes at least one of a source URI, download URI, meta data or tags; formulating a search criteria utilizing the relevant resource wherein the user edits the relevant resource information displayed in the user interface provided into at least one of the following categories to include-all, include-non or include-any, thereby tailoring the search to the users requirements; initiating a search to find a neighborhood network comprising the resource utilizing the relevant resource information; and displaying the results of the search results to the user in the user interface. Additionally, at least some aspects and embodiments further include formulating the search criteria utilizing the relevant resource information without any manual intervention.

DETAILED DESCRIPTION OF THE ILLUSTRATED EMBODIMENTS

Figure 1:
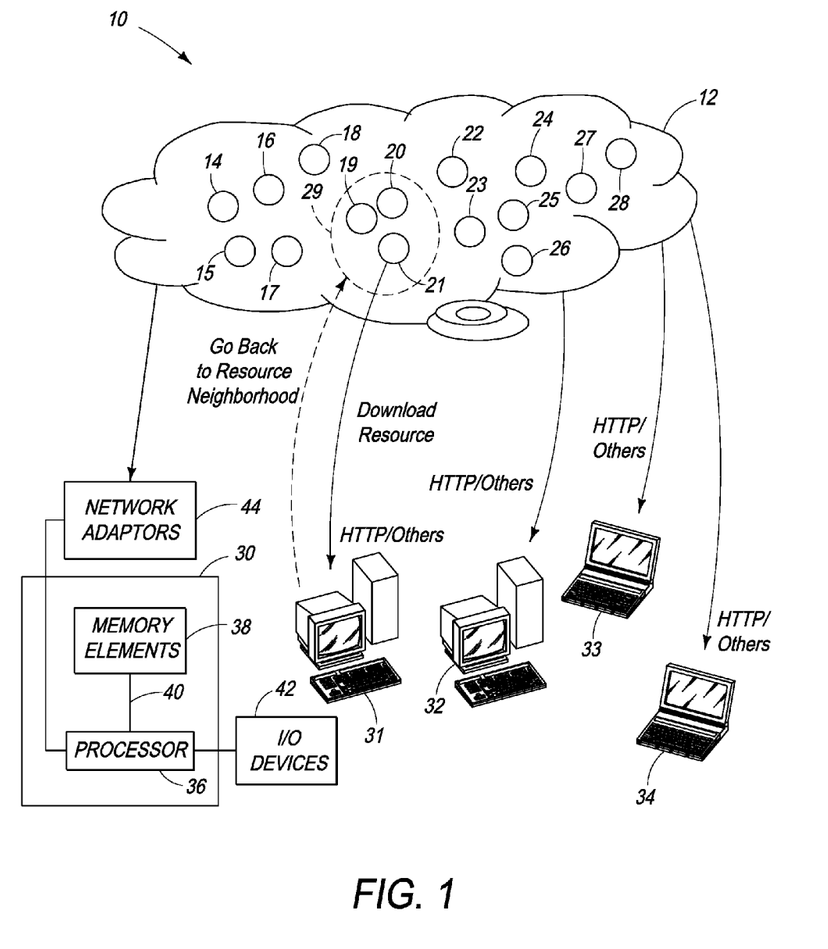
FIG. 1 is a block diagram of a system illustrating various aspects.

FIG. 1 shows a system 10 in accordance with various embodiments of the invention. Also shown in FIG. 1 is the Internet or a local area network 12 which hosts a number of resources 14, 15, 16, 17, 18, 19, 20, 21, 22, 23, 24, 25, 26, 27, and 28. Each of these resources is identified by unique Uniform Resource Identifiers (URIs). A Uniform Resource Identifier (URI) is a compact string of characters used to identify or name a resource, so as to enable interaction with representations of the resource over a network. Users download a number of these resources onto their workstations or data processing systems 30, 31, 32, 33, and 34. This is shown in FIG. 1.

A typical data processing system or workstation 30 includes at least one processor 36 coupled directly or indirectly to memory elements 38 through a system bus 40. The memory elements 38 can include local memory employed during actual execution of program code, bulk storage, and cache memories which provide temporary storage of at least some program code in order to reduce the number of times code must be retrieved from bulk storage during execution.

Input/output or I/O devices 42 (including but not limited to keyboards, displays, pointing devices, etc.) can be coupled to the data processing system 30 either directly or through intervening I/O controllers.

Network adaptors 44 may also be coupled to the data processing system 30 to enable the data processing system 30 to become coupled to other data processing systems or remote printers or storage devices through intervening private or public networks. Modems, cable modems and Ethernet cards are just a few of the currently available types of network adaptors.

When a resource 14, 15, 16, 17, 18, 19, 20, 21, 22, 23, 24, 25, 26, 27, or 28 is downloaded to a workstation 30, 31, 32, 33, or 34, the workstation is configured to store the source URI and download URI from where the resource has been downloaded. A source URI is, for example, the URI that displays the internet/intranet page with the link to the resource download or can be an internet/intranet page containing a number of resources that the user can select from to download, and including the page downloaded to the workstation. A source URI gives the exact context from where a resource 14, 15, 16, 17, 18, 19, 20, 21, 22, 23, 24, 25, 26, 27, or 28 has been downloaded. A download URI is the exact URI from where a resource can be downloaded. The button 128 in FIG. 4 leverages the source URI to go back to source page of a resource. A base URI is extracted from Source URI. A base URI is the URI of the content provider that hosts the resources to be downloaded. The button 132 in FIG. 4 would use the Base URI to search. For example, the URI http://www.google.com/talk/ can be considered as the Source URI for Google Talk, which is the page displayed from where Google Talk can be downloaded. But the actual download of a resource happens from a different URL http://dl.google.com/googletalk/googletalk-setup.exe, which is considered to be the download URI. The source URI gives the context.

In some embodiments, one or both of download URI and source URI are tracked using a browser plug-in. In other embodiments, one or both of download URI and source URI are mined from browser log files for resources downloaded onto a workstation using a browser. A base URI is derived from the source URI. In other embodiments, one or both of source URI and download URI are tracked by tracking network protocol level details.

In some embodiments, for resources existing on a workstation 30, 31, 32, 33, and/or 34, browser log files are mined to extract the source URI and other URI from where the resource has been downloaded (assuming that the resource has been downloaded using a browser). The browser log file parsing is simple file parsing.

Figure 2:
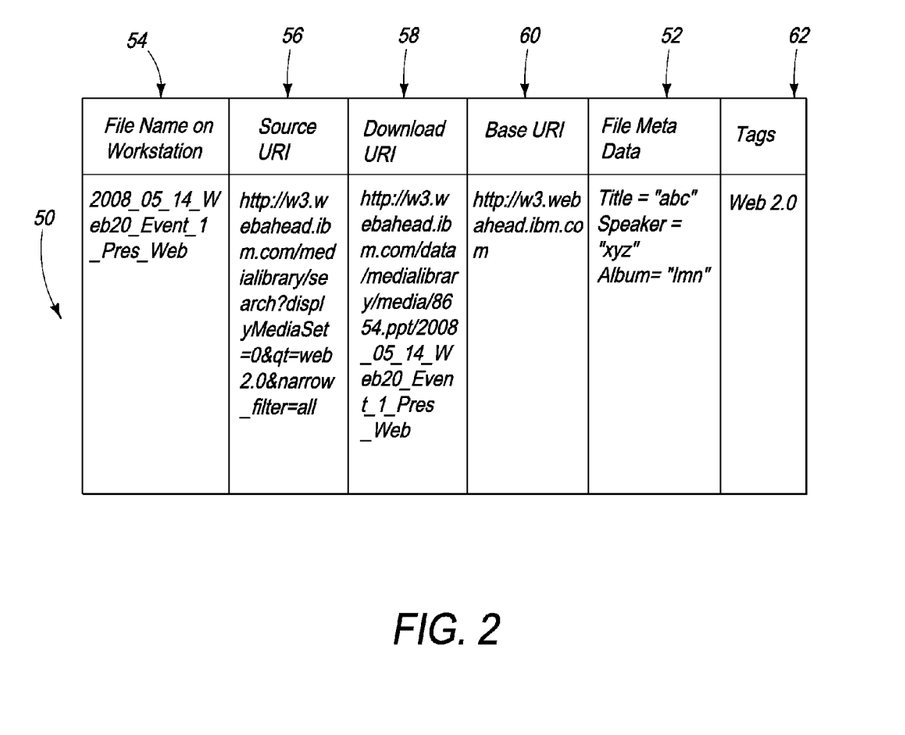
FIG. 2 illustrates data that is stored, in some embodiments, when using the system of FIG. 1.

When a resource is downloaded, meta data, if any, is tracked from the downloaded resource based on its application-type. For example, mp3 files have headers/meta-data that describes the contents of the mp3. The details are stored in a table (or file, object, database, etc.) 50 such as is shown in FIG. 2, which is stored in the memory elements 38. In the illustrated embodiment, the meta data 52 are stored as name=value pairs. When a resource is downloaded, the resource details are stored in a table 50. In some embodiments, a user is able to input some tags describing downloaded resources. This is also stored in the table 50.

In the embodiment shown in FIG. 2, the table 50 includes entries for file name 54 on workstation, source URI 56, download URI 58, base URI 60, and tags 62. Preferably table 50 may be a user defined table such as a look up table or may be a database.

In some embodiments the information in the table 50, except for tags 62, is auto-generated without user intervention. In some embodiments, browser log files are parsed to gather source information. In some embodiments, meta data are extracted from downloaded resources based on application types (for example, the mp3 headers are standardized). Therefore, unlike bookmarks where a user explicitly saves the bookmark, the information in table 50 will be automatically bound to respective downloaded resources without user intervention. Resources are leveraged to provide a user with correct contextual information about a resource.

Figure 4:
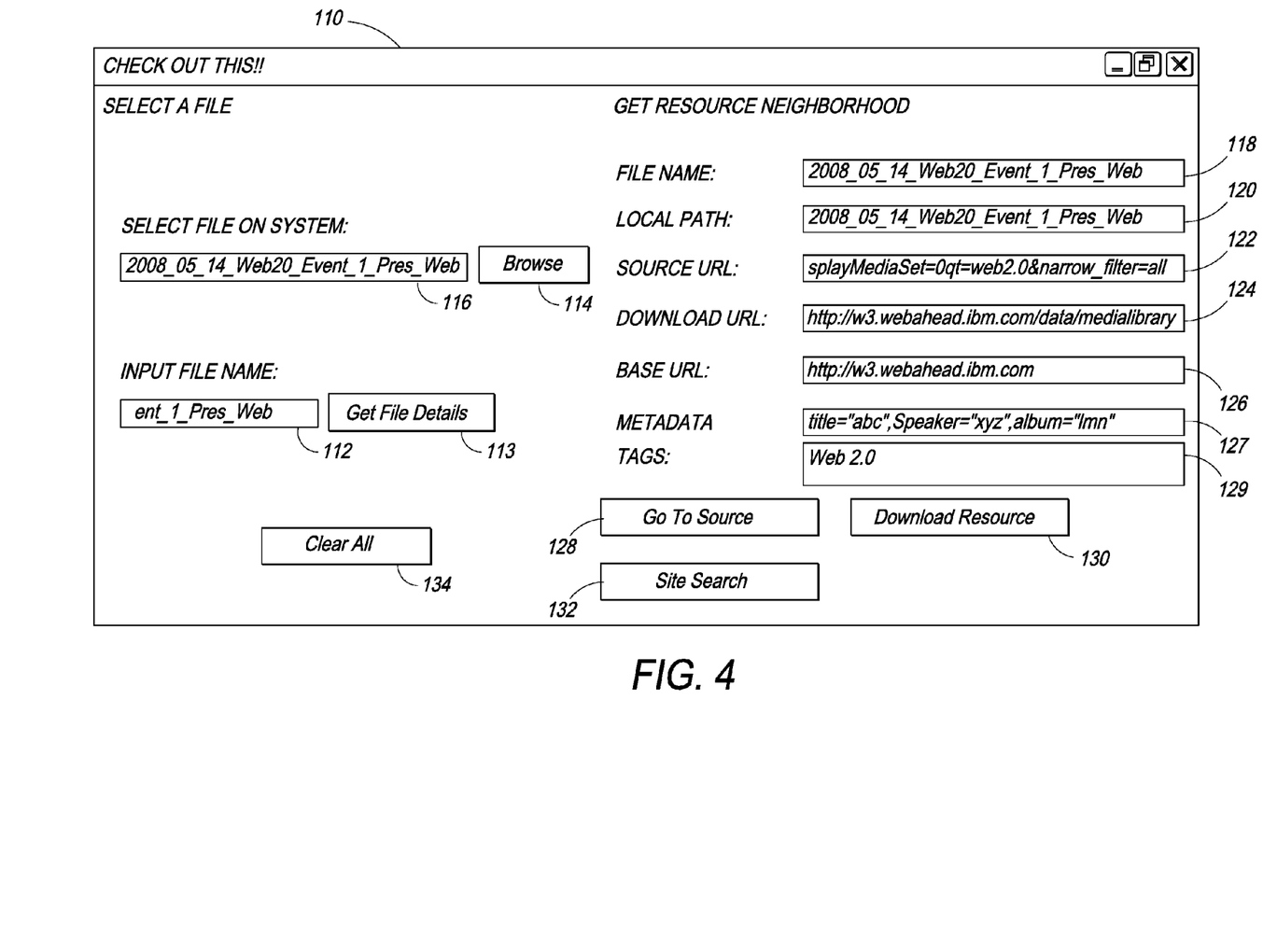
FIG. 4 is a screen shot illustrating an example of a user interface for launching a search for a neighborhood of a downloaded resource, in accordance with some embodiments.

In some embodiments, a user interface is provided through which a user can select downloaded resources on the workstation (see FIG. 4). In some embodiments, the user can simply enter resource names into a field—this is helpful in cases where the resource has been downloaded but deleted from the system or for resources where a user cannot identify the location of the resource on the workstation. In some embodiments, the user can select a downloaded resource and right click, for example, to begin a search of a resource neighborhood 29 (see FIG. 1 for a resource neighborhood).

A neighborhood 29 of a resource is the logical representation of an area on the Internet or network which includes resources considered similar to the downloaded resource, as described above. For example, consider a resource such as an mp3 file of a song titled "X" from the album "Y" sung by artist "Z." The neighborhood 29 of this resource could be any song related to the song "X" such as other songs sung by "Z." Alternatively, the neighborhood 29 could be defined by other songs from the album "Y." This neighborhood 29 could be located at a top level domain or at the exact URL from where the original resource was downloaded or elsewhere. In some embodiments, a user is able to define a neighborhood in which to search for additional resources.

If there is a corresponding entry for the resource in the table 50, the source and meta data details are retrieved and populated in a search form, such as the one shown in FIG. 4.

In some embodiments, a user can, should he or she desire, perform a search based on source URI, download URI and/or base URI.

For example, a user can, should he or she desire, go back to the exact source from where a resource was downloaded. In this case, the user is taken to the source URI.

A user can, should he or she desire, download a resource based on a download URI of a previously downloaded resource.

A user can, should he or she desire, search for a resource using the base URI of a previously downloaded resource. In this case, a search is set up based on the base URI. For a particular base URI pattern, users could embed, for example, a search engine URL. An existing third party search API (e.g., Google, Yahoo, Alta Vista, etc.) or a corporate Intranet search API (for example, an IBM w3 search) could be employed. For example, for a base URI of a pattern http://w3.ibm.com, users can selectively embed the search engine to be the URL of the IBM intranet search engine.

In some embodiments, the User could alternatively edit the source field to a wildcard character, such as "*," and perform a neighborhood search. A complete search is then performed. For example, in some embodiments a search is selectively performed using a third party search (e.g. Google, Yahoo, Alta Vista, etc.), using the meta data values as keywords. In some embodiments, the meta data values are auto populated in a search interface (search page).

In the illustrated embodiments, a user can selectively edit meta data and tag details that have been auto-populated, and perform a search. The search query is constructed using meta-data and tag values.

Examples of searches that can be performed include searches with all the meta data, and tag values; searches with at least one of the meta data and tag values; and searches for resources without meta data and/or tag values ("not" or "nor" searches).

The results of neighborhood searches are displayed to a user after a search is initiated and performed.

In some embodiments, options are provided to compose different file formats. For example, an mp3 and a jpeg can be used to compose a search. Various embodiments also support using information from downloaded resources to create complex neighborhood searches. For example, consider that the workstation has had two resources downloaded to it, one is an mp3 file from a movie named "The History of IBM" and another is an mp3 file whose composer is named "Reddy." A user is able to compose a search based on both resources. A search request could be performed, for example, to retrieve resources composed by "Reddy" but not from the movie "The History of IBM".

In some embodiments, during composition of a search, a user has the option to search from multiple sources (e.g., each source belonging to each resource being composed). The meta data values are merged, allowing the user to edit the meta data values and perform a search.

In some embodiments, for resources existing on a workstation, prior to this solution being deployed, browser log files are mined to extract the source URI and other URI from where the resource has been downloaded (provided that the resource has been downloaded using a browser). The browser log file parsing is simple file parsing. From the browser log files, the path of the resource on the local file system is extracted in some embodiments. Then, meta data from the resource is extracted, based on the application type, on the local workstation. The table of FIG. 2 can thus be populated for resources already existing on a workstation. A user can then reach the resource neighborhood of these resources too.

Figure 3:
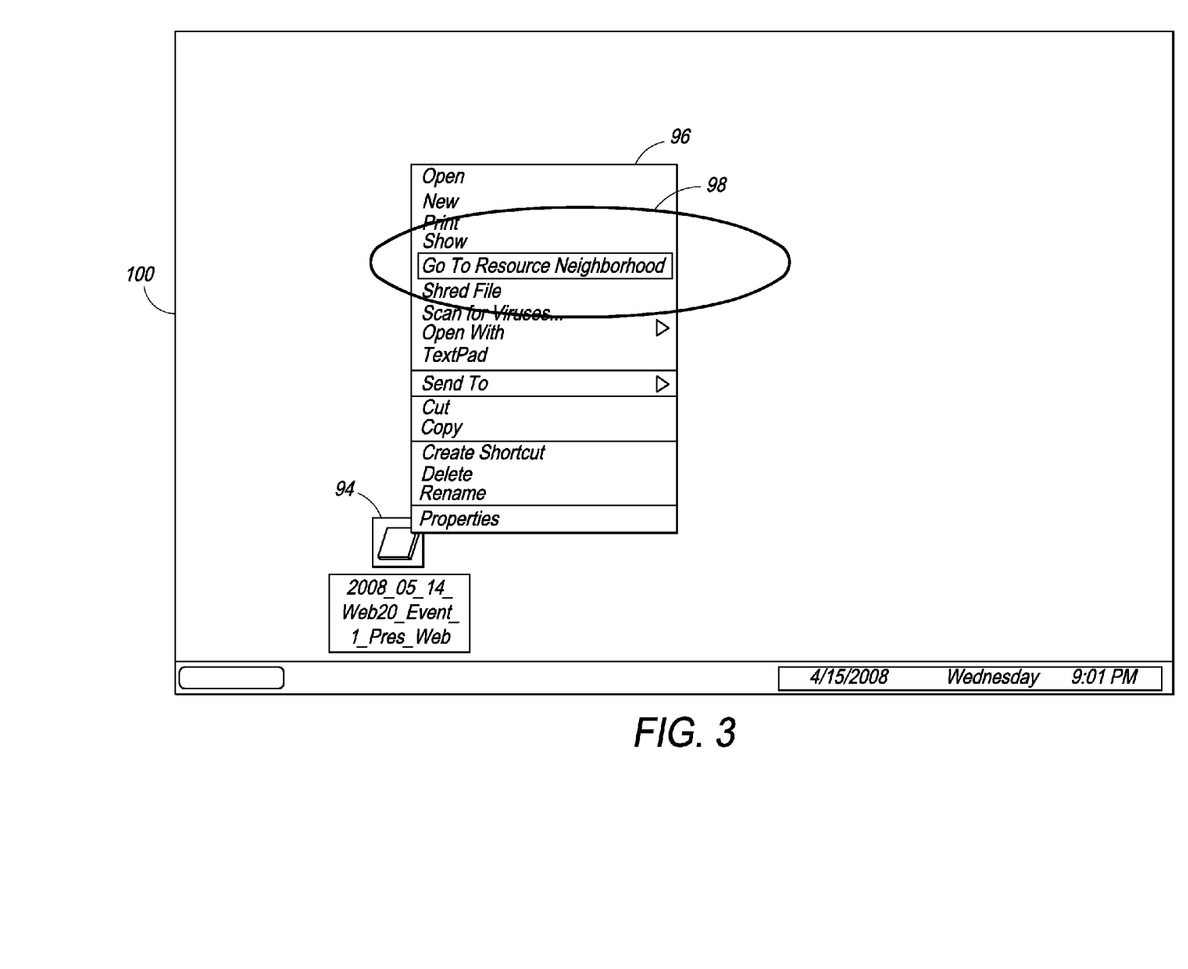
FIG. 3 is a screen shot illustrating an example of how to launch a search for a neighborhood of a downloaded resource, in accordance with some embodiments.
Figure 5:
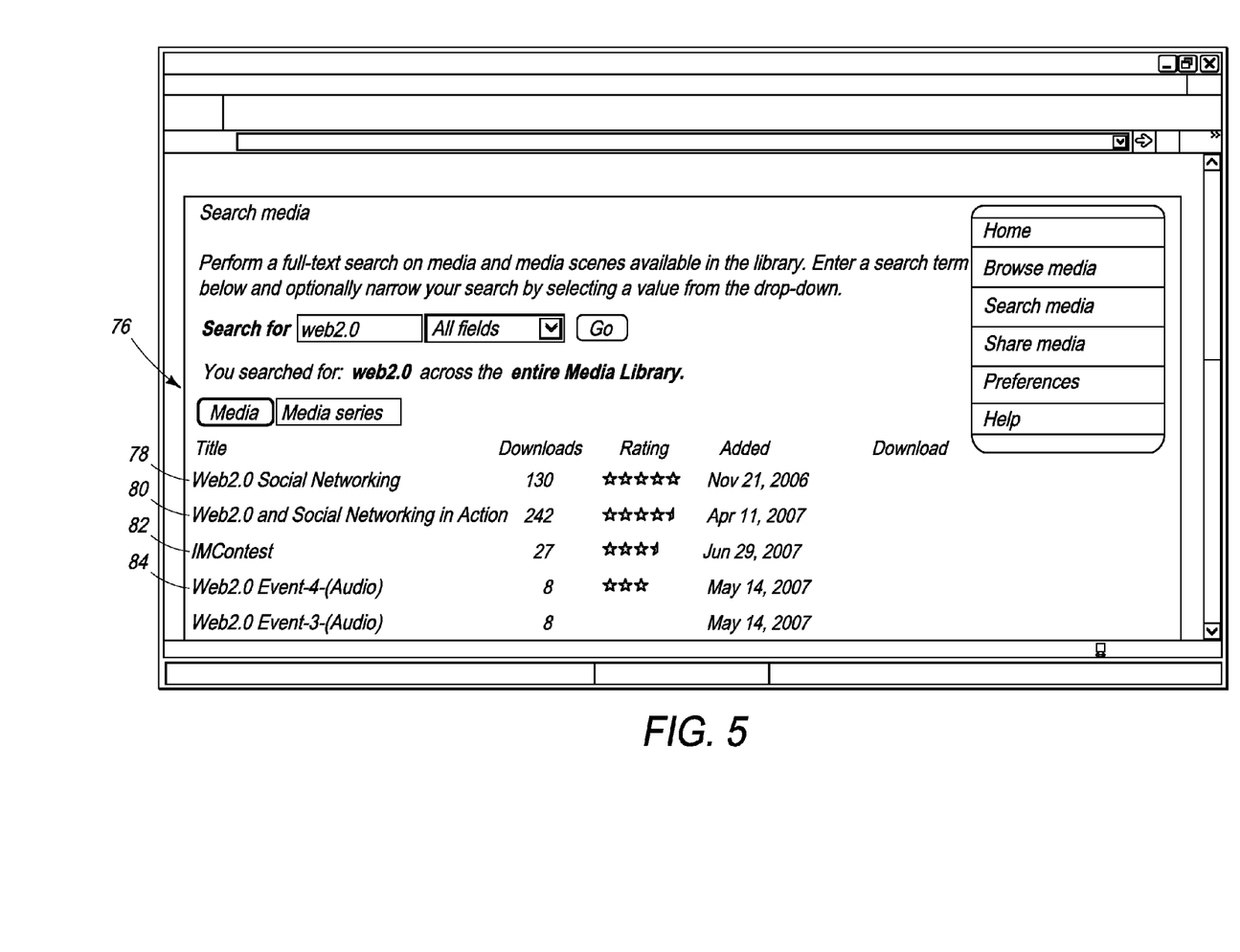
FIG. 5 is a screen shot illustrating the user being taken back to the source URI for the downloaded resource, in accordance with some embodiments.

FIGS. 3-5 illustrate a sample scenario. Assume that a user has entered a search term in a search field of a user interface to search the Internet or to search an Intranet. Assume further that a user has selected a resource from the search results and has downloaded that resource. Assume now that the user wants to launch a search for a neighborhood of a downloaded resource.

FIG. 3 is a screen shot illustrating an example of how to launch a search for a neighborhood of a downloaded resource, in accordance with some embodiments. In the illustrated embodiment, when a user right clicks an icon 94 representing a downloaded resource, a menu 96 appears which includes an option 98 to go to the resource neighborhood of the resource. While FIG. 3 illustrates right clicking an icon on a desktop 100, in other embodiments an icon in a list or window can be right clicked. Further, other alternatives are possible for launching a search for a resource neighborhood such as through manipulation of pull down or other menus.

FIG. 4 is a screen shot illustrating an example of a user interface 110 for launching a search for a neighborhood of a downloaded resource, in accordance with some embodiments. In some embodiments, fields in the user interface are auto-filled in response to a launch of a type shown in FIG. 3.

In some embodiments, the user can simply enter resource names into a field 112, this is helpful in cases where the resource had been downloaded but deleted from the system. When a button 113 is pressed, file details are filled in for fields 118, 120, 122, 124, 126, 127 and 129. Thus, in some embodiments, resources that have been downloaded and deleted can be downloaded again or several times over again by pressing a button 130, since information about the resource was previously stored. The illustrated user interface 110 also includes a facility 114 to allow a user to browse the workstation to find a downloaded file. The file name then appears in area 116 when selected. Thus, instead of launching the interface 110 by right-clicking an icon for a resource, the user interface 110 can be launched as a program, such as from a Start menu, system tray, desktop or any other way a program is launched, and then a file can be chosen for a search. The interface 110 includes a field 118 for a file name, a field 120 for local path, a field 122 for source URL, a field 124 for a download URL, a field 126 for a base URL, a field 127 for metadata, and a field 129 for tags. In some embodiments, these fields are auto-filled but can be edited. The user interface 110 of the embodiment shown in FIG. 4 also includes a button 128 for effecting the search, to take the user to the resource neighborhood (which may be an Internet Source or Intranet Source). After a user pushes button 128, the screen shown in FIG. 5 appears. The user interface 110 of the embodiment shown in FIG. 4 also includes a button 132 to effect a search such as a Google, Yahoo, or other Internet search. The user interface 110 of the embodiment shown in FIG. 4 also includes a button 134 for clearing fields. While a very specific user interface has been illustrated in FIG. 4, various modifications could be made to the layout, type of interface elements, number or names of fields, etc. Further, the illustrated user interface 110 does not fully illustrate all the novel systems and methods contemplated herein. For example, searches that can be performed include searches with all the meta data, and tag values; searches with at least one of the meta data and tag values; and searches for resources without meta data and/or tag values ("not" or "nor" searches).

FIG. 5 is a screen shot illustrating the user being taken back to the source URI for the downloaded resource, in accordance with some embodiments.

Figure 6:
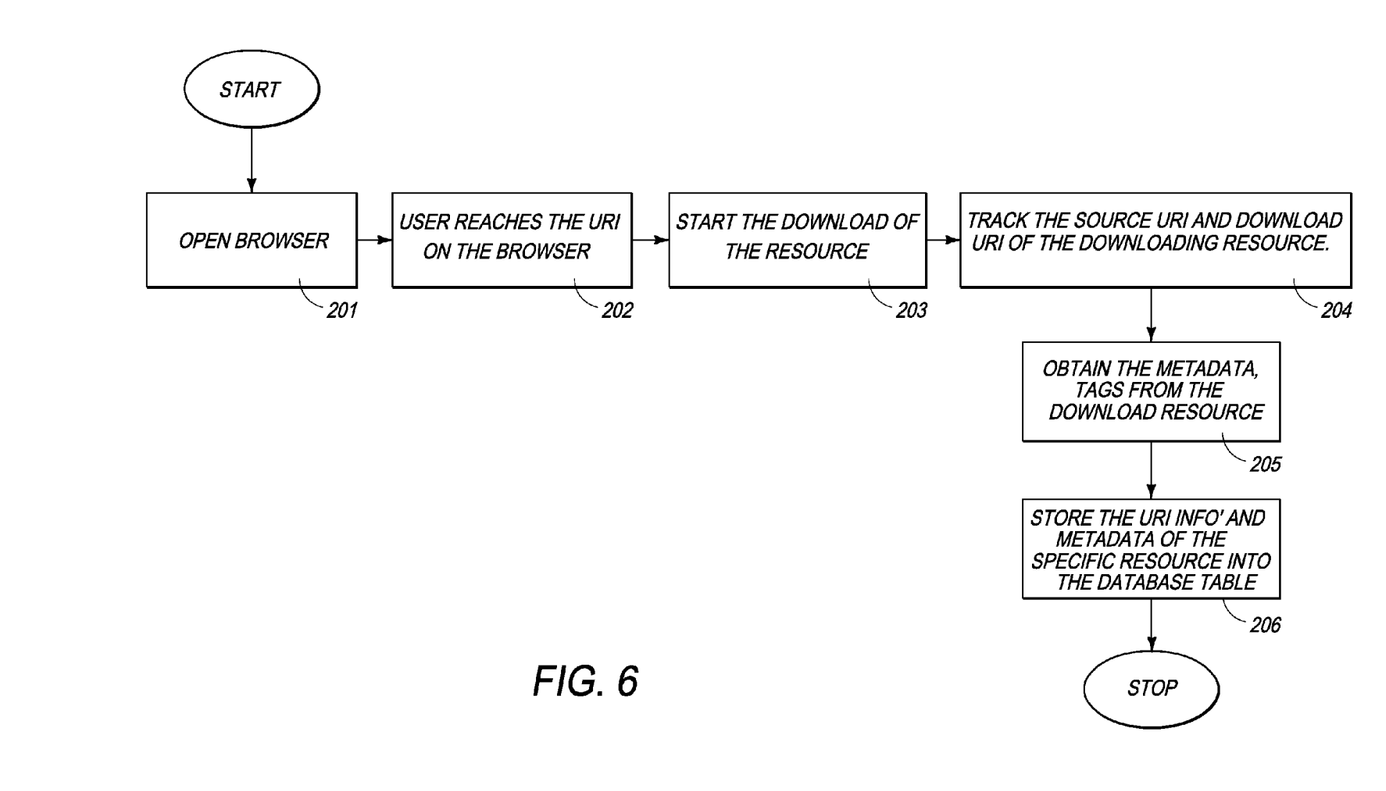
FIG. 6 is a flowchart illustrating creating a table, such as the table shown in FIG. 2, in accordance with some embodiments.

FIG. 6 is a flowchart illustrating creating a table, such as the table shown in FIG. 2, in accordance with some embodiments.

In step 201, a browser is opened on a workstation or on a data processing system which includes a variety of systems comprising at least a processor, a memory and an operating system loaded on the system, which range from desktop computers, laptop computers, personal digital assistants, mobile phones etc.

In step 202, the URI of a resource is reached on the browser.

In step 203, downloading of the resource is initiated.

In step 204, the source URI and download URI of the downloading resource are tracked or determined either while or after the resource is downloaded. There are many ways of doing this, as is described above.

In step 205, the meta data tags are obtained from the downloaded resource.

Figure 7:
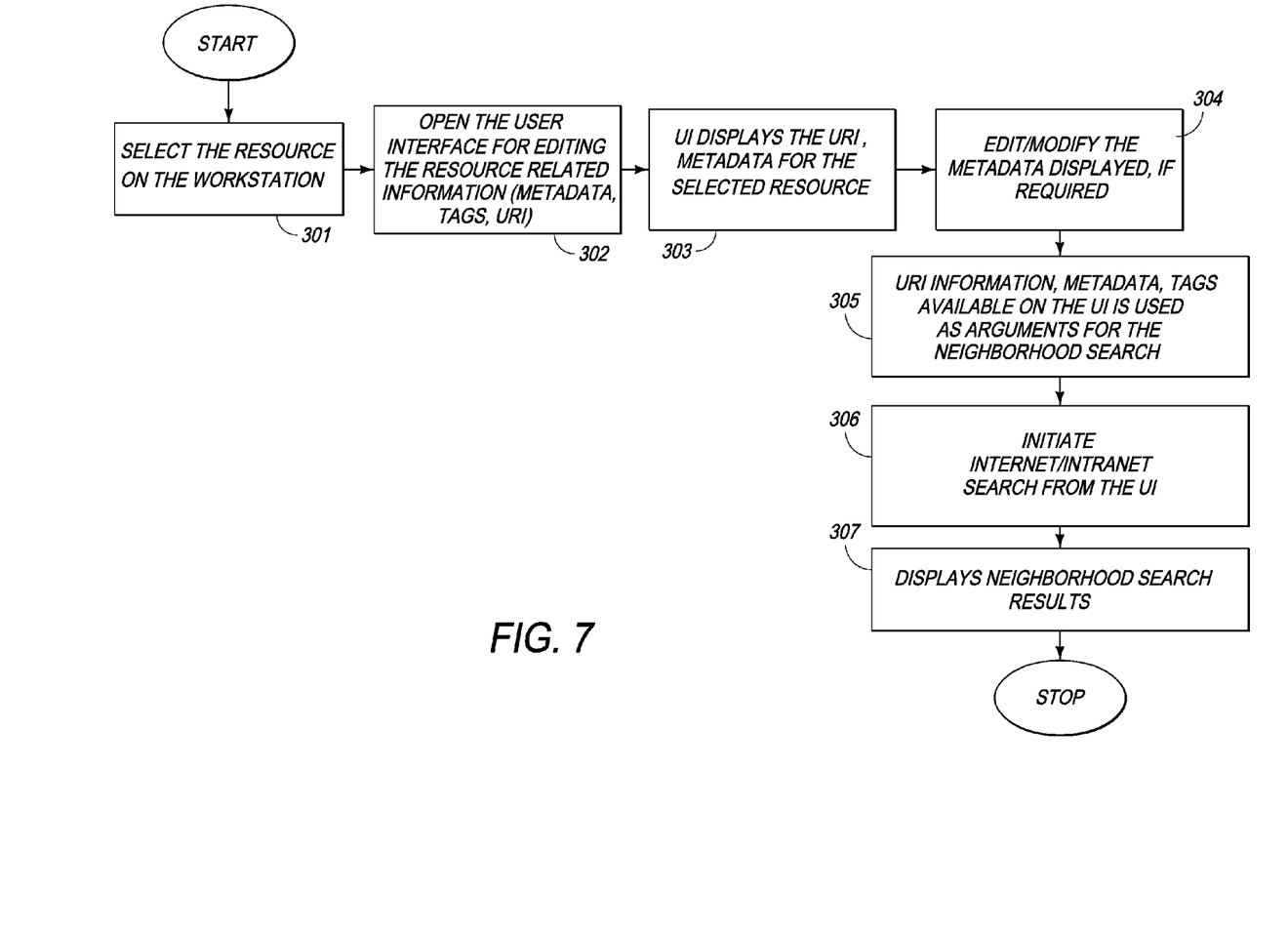
FIG. 7 is a flowchart illustrating execution of a search for a neighborhood of a downloaded resource, in accordance with some embodiments.

In step 206, the URI information and the meta data from the resource are stored for use during a search such as of the type of FIG. 7. In some embodiments, the order of steps 204 and 205 are reversed.

FIG. 7 is a flowchart illustrating execution of a search for a neighborhood of a downloaded resource, in accordance with some embodiments.

In step 301, a resource or file on the workstation is selected.

In step 302, a user interface (such as or similar to the one shown in FIG. 4) is opened. In the embodiment of FIG. 7, information about the resource (e.g., meta data, tags, or URI) can be edited in the user interface in step 302.

In step 303, the user interface (such as or similar to the one shown in FIG. 4) displays the URI and/or meta data for the selected resource.

In step 304, a user may edit or modify the displayed URI or meta data as required.

In step 305, URI information, meta data, and tags available on the user interface are used as arguments for the neighborhood search.

In step 306, an Internet or Intranet or network search is initiated from the user interface.

In step 307, the search results are displayed.

Aspects of the invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, various embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code is the workstation 30 shown in FIG. 1.

Also, it is noted that embodiments are not limited to a particular protocol such as HTTP/FTP etc. Other embodiments exist for protocols such as the lotus domino protocol. Thus, a system and method has been provided to leverage any downloaded resource to reach its source and neighborhood, irrespective of the source and protocol.

In compliance with the patent statutes, the subject matter disclosed herein has been described in language more or less specific as to structural and methodical features. It is to be understood, however, that the claims are not limited to the specific features shown and described, since the embodiments herein disclosed comprise example embodiments. The claims are thus to be afforded full scope as literally worded, and to be appropriately interpreted in accordance with the doctrine of equivalents.

We claim:

1. A method for locating a resource in a neighborhood network, the method comprising:
    selecting a source uniform resource identifier (URI) and a download URI from which a resource is to be downloaded, the source URI providing information on a number of available resources and the download URI providing the exact URI from which the resource is downloaded;
    tracking the source URI and the download URI of the resource being downloaded;
    extracting relevant resource information from the downloaded resource, the relevant resource information including at least one of a meta data or tags; and
    storing the source URI, download URI and the relevant information in a table, wherein the table includes at least one of a database or a lookup table.

\* \* \* \* \*